UNITED STATES PATENT OFFICE.

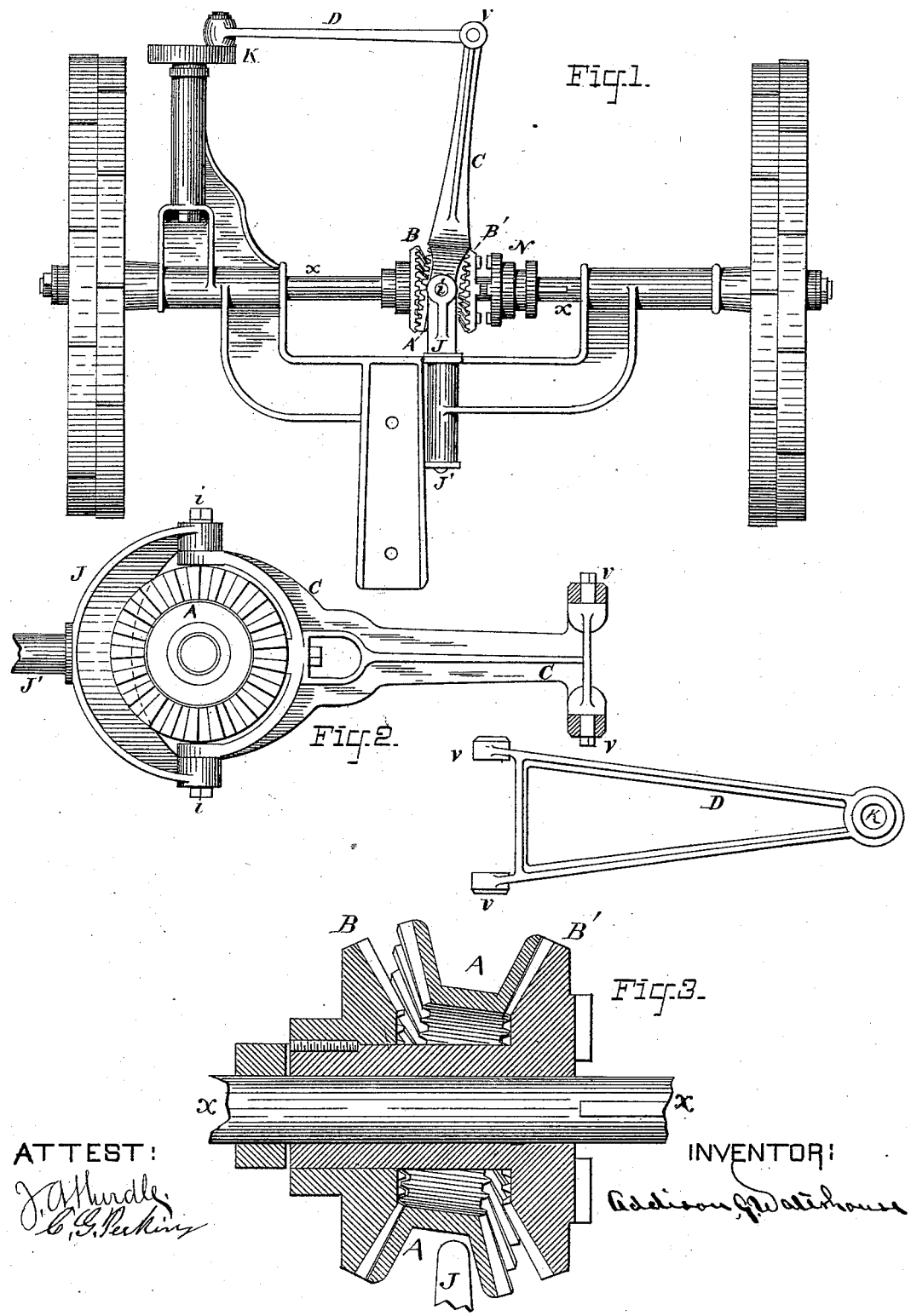

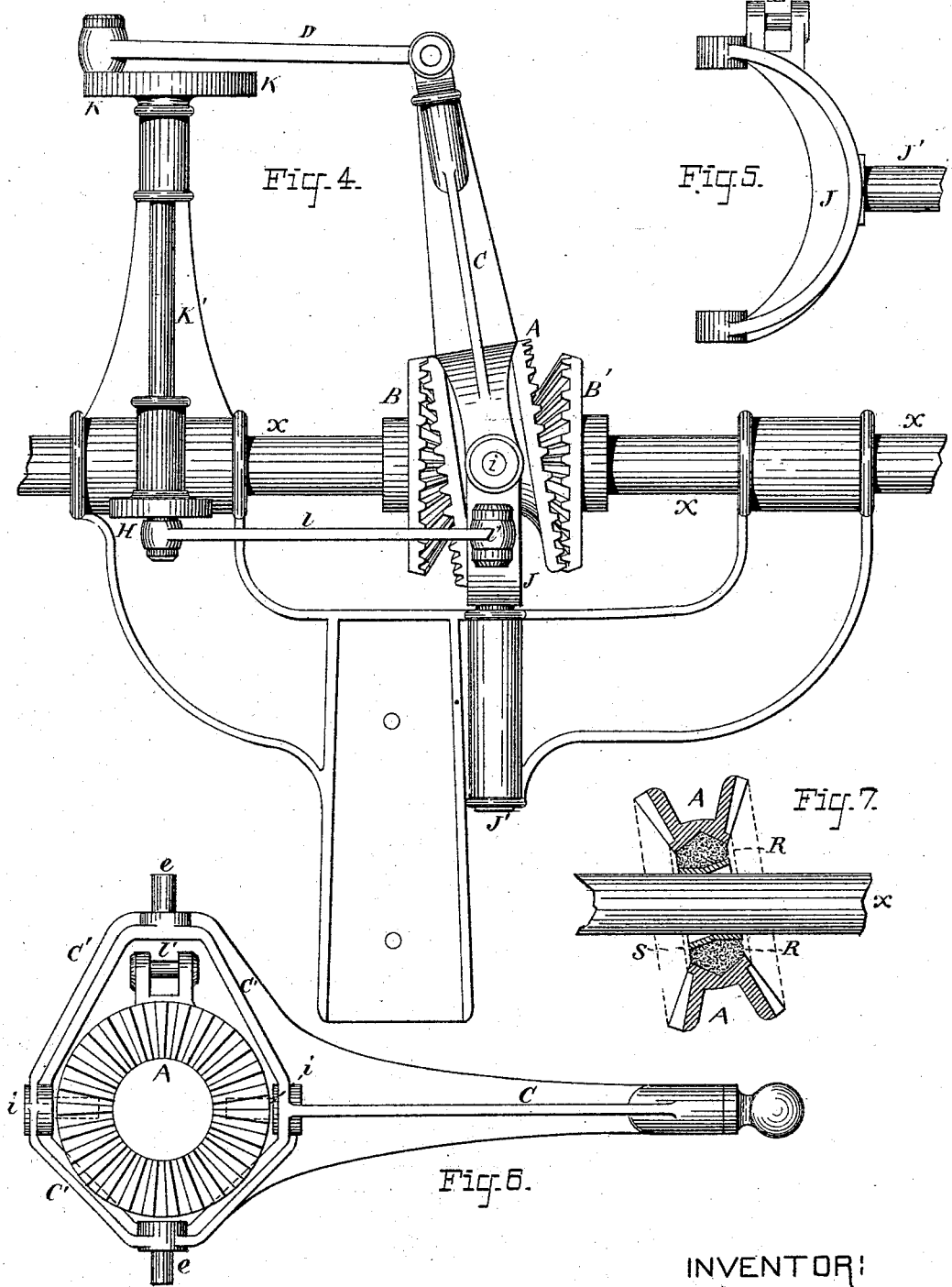

ADDISON G. WATERHOUSE, OF NEW YORK, N. Y.

MECHANICAL MOVEMENT.

SPECIFICATION forming part of Letters Patent No. 277,964, dated May 22, 1883.

Application filed October 4, 1882. (No model.)

*To all whom it may concern:*

Be it known that I, ADDISON G. WATERHOUSE, of the city and State of New York, have invented a new and useful Improvement in Mechanical Motions Adapted to Harvesters, Mowers, and other Machinery, of which the following is a full, clear, and exact description, reference being had to the accompanying drawings.

My invention belongs to that class of mechanical motions in which one or two revolving gear-wheels mesh into a second or oscillating wheel placed loosely upon the same shaft and coaxle with the revolving wheels, so that the rotation of the former will cause a rolling oscillation to be imparted to the second wheel, which motion may be converted into a more rapid rotary or reciprocating motion.

Movements of a similar kind have heretofore been described and patented in Patent No. 101,719, of April 12, 1870, to Rudolf Eickemeyer, and No. 137,115, of March 25, 1873, to the undersigned, A. G. Waterhouse, as both describe a certain oscillating differential gearing; and this invention consists of certain improvements on said class of gearing, as will be hereinafter described.

My present invention more particularly relates to forming a gearing adapted to convert the slow rotating motion of the axle or shaft of a harvester or mower into the more rapid reciprocating motion required to work the cutter; but the same mechanism may be applied to many other purposes; and it consists of the means of controlling the motion of the oscillating wheel and of conveying its movement to the cutter of the machine.

In the accompanying drawings, Figure 1 is a plan of part of a mowing-machine, showing the part embodying my invention. Fig. 2 is an enlarged detail of Fig. 1. Fig. 3 is an enlarged detail of the toothed wheels shown in Fig. 1. Fig. 4 is a plan of part of a mower in which is shown another form of my gearing worked by the rotation of the mower shaft or axle $x$. Fig. 5 is a detail of Fig. 4. Fig. 6 is a modified detail of Fig. 4. Fig. 7 is a modified detail of the oscillating wheel shown in Figs. 1, 2, 3, 4, and 6.

In Fig. 1, $x$ is the axle of a mower. On $x$ are placed two beveled toothed wheels, B and B', both made alike in size and teeth. These wheels are rigidly connected together and placed loosely on shaft $x$, so that they are rotated by shaft $x$ by engaging the clutch N. Between the wheels B and B' is placed the double-faced oscillating wheel A, so hung as to be free to change its plane to any angle, but still be prevented from turning. This wheel A is provided on each side with teeth that will mesh in the teeth of the wheels B B', and, being hinged exactly between the wheels B B', as the teeth of B mesh in wheel A, the opposite teeth of A will mesh into the teeth of B' at a point diametrically opposite to the point of contact between B and A; so, whichever angle the wheel A may be at, the points of contact between B and A and B' and A will be diametrically opposite to each other. Now, the diameter of A is larger than B B' by one or more teeth, so that as wheel A is caused to roll without revolving until each one of its teeth has meshed into the teeth of B B', it will cause B B' to rotate one tooth, providing A has one tooth more than B B'; or B B' will rotate a part of a circle equal to the number of teeth in A over the number in B or B' each time that A rolls around so as to mesh all of its teeth. Now, the reverse will happen each time B B' is made to rotate a part of a revolution equal to the difference between the teeth in A and those in B. It will cause wheel A to roll around, or what I call "perform a complete vibration;" so, if B B' have twenty teeth each and the sides of A have twenty-one teeth each, then at each revolution of B B', A will be caused to vibrate twenty times, provided, however, that the rolling motion of A is controlled by a suitable mechanism that will cause A to tip at such an angle as to just mesh in the teeth of B B' at a proper depth and roll around, so as to mesh each tooth successively and still be prevented from revolving. This object I obtain by a mechanism that forms the leading feature of my invention. I know that the two former patents referred to employ wheels that perform the same movement and results of this mechanism—that is, Patent No. 101,719 uses one revolving wheel that meshes into a single-faced oscillating wheel; but in this case the oscillating wheel has to be controlled in three ways: First, its center of oscillation has to be kept coaxle with and a proper distance from the revolving wheel; second, it has to be prevented from turning, and still allowed to oscillate, and, third, it has to be guided in its oscillations so that it will mesh in the revolving wheel to the proper pitch-line. The first and second objects are obtained, as shown in said patent, by a gimbal or a ball joint and a swinging link. The third is obtained by a swinging arm that is attached to the oscillating wheel and works in a crank fixed as near coaxle to the revolving wheel as possible. In Patent No. 137,115 two revolving wheels are employed that mesh in the double face of the oscillating wheel, as in this form. But two things are necessary to govern the oscillating wheel, which are, first, the swinging link that keeps the oscillating wheel from revolving, and, second, the swinging arm connected to the oscillating wheel, that works in a crank placed as near coaxle with the wheels as possible, that causes the teeth of all three wheels to mesh in the proper pitch-line, the oscillating wheel in the last patent, as in this case, being kept in its position by the teeth of the two revolving wheels meshing in on both sides of it, so as to keep it in position between them. My present invention is different from both of these cases cited in the manner of controlling the motion of the oscillating wheel, and is free from many of the objections common to both of them. In controlling the oscillating wheel it is necessary that it should be made to roll in teeth of the revolving wheels exactly to their pitch-line, and no farther, and in doing so the oscillating wheel must perform a universal motion—that is, its plane must assume every possible angle within the limit of its vibrations; and in order to control the wheel I hang it in the fork J, (see Figs. 1, 2, 4, and 5,) so that the wheel is pivoted in the fork J by the pins $i$, Fig. 2, so as to be free to swing one way within the fork, and the fork is provided with a shaft, J', that is supported in a bearing that allows the fork to swing at right angles to the plane on which the wheel swings within the fork, so that the wheel A is free to swing both ways or at all angles. By the use of this fork the swing of the wheel is provided for, and by it the wheel is prevented from turning; but in place of this fork the wheel may be hung loosely between the wheels B B'.

Figs. 6 and 7 show different ways of hanging the wheel A. Now, for controlling the motion of A, I use in one case the vibrating arm C, the hinged connecting-rod D, and the crank K. The throw of the crank on a plane with the arm C allows the wheel A to oscillate from the pitch-line of B to that of B', and no farther, and the throw of the crank at right angles to the rod D causes an up-and-down motion to the crank end of rod D, that causes rod D, through the hinge $v$, (see Fig. 2,) to cause a torsion to the arm C that swings the wheel from the pitch-line of B to that of B' at right angles to the vibration of C; so by the vibration of C imparting a rotation to the crank K the crank in return governs the motion of A. Another way of using the crank K to govern A is shown in Fig. 4. In this the rod D can be connected to C at $v$ by any form of bearing that may be a ball-joint or otherwise. In this the vibration of A drives the crank K, the crank being provided with a shaft, K', at the other end of which is a second crank, H. This crank, being at right angles to K, is connected by rod L to the fork J at L', (see Fig. 5, a detail showing bearing L';) or the rod L may be connected directly to the wheel A at right angles to the arm C, which is in all cases rigidly attached to the wheel A. (See Fig. 6.) The use of the second crank, H, is twofold, one being to govern the wheel A, so as to cause it to mesh in the wheels B B' to their pitch-lines at the right time, and the other is to transmit the motion of wheel A through the crank H, shaft K', to the crank K, as well as to transmit through arm C and rod D to K.

In this application the cutter of the mower is supposed to be driven by the crank K, or by the rod D, that drives the crank.

Fig. 2 is an enlarged view of part of Fig. 1, showing the wheel A surrounding the axle $x$ without touching it, the fork J, that vibrates with its shaft J', the wheel A, hung in the fork J by the pins $i$, so that A is free to swing, the arm C, rigidly attached to wheel A, and the connecting-rod D, (shown in detail,) that is hinged to the arm C by the remote bearings $v$ $v$, so that as the crank end of D is raised or lowered, it, by torsion through C, swings the wheel A to the proper angle.

Fig. 3 is an enlarged section of the wheels B, B', and A, showing how B and B' are rigidly connected together, and how A is placed loosely between them. The wheels B B' are caused to rotate by the shaft $x$, upon which they are placed, and to which they may be engaged by clutch N. (See Fig. 1.)

In Fig. 6, C' is a form of compass joint or ring, of which the arm C is a part, and in which the wheel A is pivoted, as shown, so that it can swing within the ring, and the whole can swing on the pins $e$ at right angles to the pivots upon which the wheel A swings.

L' is a bearing to which the rod L of the crank H is attached. (See Fig. 4.)

Fig. 7 is a section of the wheel A. In this drawing it is bushed with elastic material or rubber R, with a metallic tube, S, the use of this bushing being for the purpose of preventing noise or rattle of wheel A when the fork J is not used, and when the wheel is kept from turning by a loose link.

In all the drawings I have shown the three-wheel form of gearing as set forth in Patent No. 137,115, instead of the form shown in No. 101,719, from the fact of the greater strength and compactness of the former, and the fact that the rotating wheels acting upon both sides of wheel A alike cause it to vibrate without causing any contact between the wheel A and the bearing that it surrounds. In fact, the opposite strain of wheels B B' balances the wheel A and keeps it central; but the arm C, rod D, and crank K in both the forms shown can be used to control the vibrating wheel when only one rotating wheel is used, as shown in Patent No. 101,719, as well as with the three wheels above described.

What I claim as my invention is—

1. In combination with wheel A, the rigid arm C, the jointed connection D, and the crank K, substantially as and for the purposes set forth.

2. The wheel A, arm C, rod D, crank K, and crank-shaft K', in combination with the crank H and rod L, connected to A, or to a part of the mechanism that imparts its motion to wheel A, substantially as and for the purposes set forth.

3. The arm C and crank K, propelled by the wheel A, in combination with the cutting apparatus of a harvester or mower, substantially as and for the purposes set forth.

4. The shaft K', with its crank or cranks, placed at or nearly at right angles to the axle or shaft $x$, in combination with the connecting rod or rods and the oscillating wheel A, driven by one or two rotating wheels, substantially as and for the purposes set forth.

5. The fork J, with its shaft J', in combination with wheel A, substantially as and for the purposes set forth.

6. The oscillating wheel A, provided with elastic bushing R, substantially as and for the purposes set forth.

7. The wheels B and B', rigidly connected together, so as to be placed loosely on the shaft $x$, in combination with wheel A, substantially as and for the purposes set forth.

ADDISON G. WATERHOUSE.

Witnesses:
JULIAN A. HURDLE,
CHARLES G. PERKINS.